US012757065B2

(12) United States Patent
Peitzer et al.

(10) Patent No.: US 12,757,065 B2
(45) Date of Patent: Oct. 6, 2026

(54) SYSTEMS AND METHODS FACILITATING CONFIGURATION OF ROUTER QUALITY OF SERVICE POLICIES FOR PRIORITIZING STANDALONE NETWORK TRAFFIC

(71) Applicants: AT&T Intellectual Property I, L.P., Atlanta, GA (US); AT&T Mobility II LLC, Atlanta, GA (US)

(72) Inventors: Haywood S. Peitzer, Randolph, NJ (US); David Peitzer, Somerville, NJ (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 301 days.

(21) Appl. No.: 18/671,232

(22) Filed: May 22, 2024

(65) Prior Publication Data

US 2025/0365608 A1 Nov. 27, 2025

(51) Int. Cl.

| | |
|---|---|
| ***H04W 28/02*** | (2009.01) |
| ***H04W 40/28*** | (2009.01) |
| ***H04W 72/1263*** | (2023.01) |

(52) U.S. Cl.

CPC ....... *H04W 28/0268* (2013.01); *H04W 40/28* (2013.01); *H04W 72/1263* (2013.01)

(58) Field of Classification Search

CPC ............. H04W 28/0268; H04W 40/28; H04W 72/1263

See application file for complete search history.

(56) References Cited

U.S. PATENT DOCUMENTS

| | | | | |
|---|---|---|---|---|
| 2017/0317894 | A1* | 11/2017 | Dao | H04L 41/5009 |
| 2019/0098634 | A1* | 3/2019 | Watfa | H04W 28/12 |
| 2021/0234803 | A1* | 7/2021 | Parekh | H04W 72/543 |

* cited by examiner

*Primary Examiner* — Tejis Daya

(74) *Attorney, Agent, or Firm* — Guntin & Gust, PLC; Miyoung Shin

(57) ABSTRACT

Aspects of the subject disclosure may include, for example, receiving data packets from a plurality of user equipment, where the data packets are classified according to markings configured to identify a class of service to which each packet belong, and the class of service is associated with a quality of service that determines a priority treatment of each packet; detecting the markings of each packet and based on the detected markings, recognizing that each packet corresponds to standalone network traffic or non-standalone network traffic; and prioritizing forwarding of the standalone network traffic when a determination is made that bandwidth is limited. Other embodiments are disclosed.

20 Claims, 14 Drawing Sheets

240

250

254

260

280

300

600

SYSTEMS AND METHODS FACILITATING CONFIGURATION OF ROUTER QUALITY OF SERVICE POLICIES FOR PRIORITIZING STANDALONE NETWORK TRAFFIC

FIELD OF THE DISCLOSURE

The subject disclosure relates to systems and methods facilitating configuration of router quality of service policies for prioritizing standalone network traffic.

BACKGROUND 5G standalone (5G SA) is a cellular infrastructure implemented and built specifically for 5G services based on 5G standards and protocols in access network and a mobile core. Migration to the 5G SA has been delayed across the wireless communication industry. Prioritizing the 5G SA in router quality of service policies may incentivize and facilitate the migration to the 5G SA.

BRIEF DESCRIPTION OF THE DRAWINGS

Reference will now be made to the accompanying drawings, which are not necessarily drawn to scale, and wherein.

DETAILED DESCRIPTION

Figure 1:
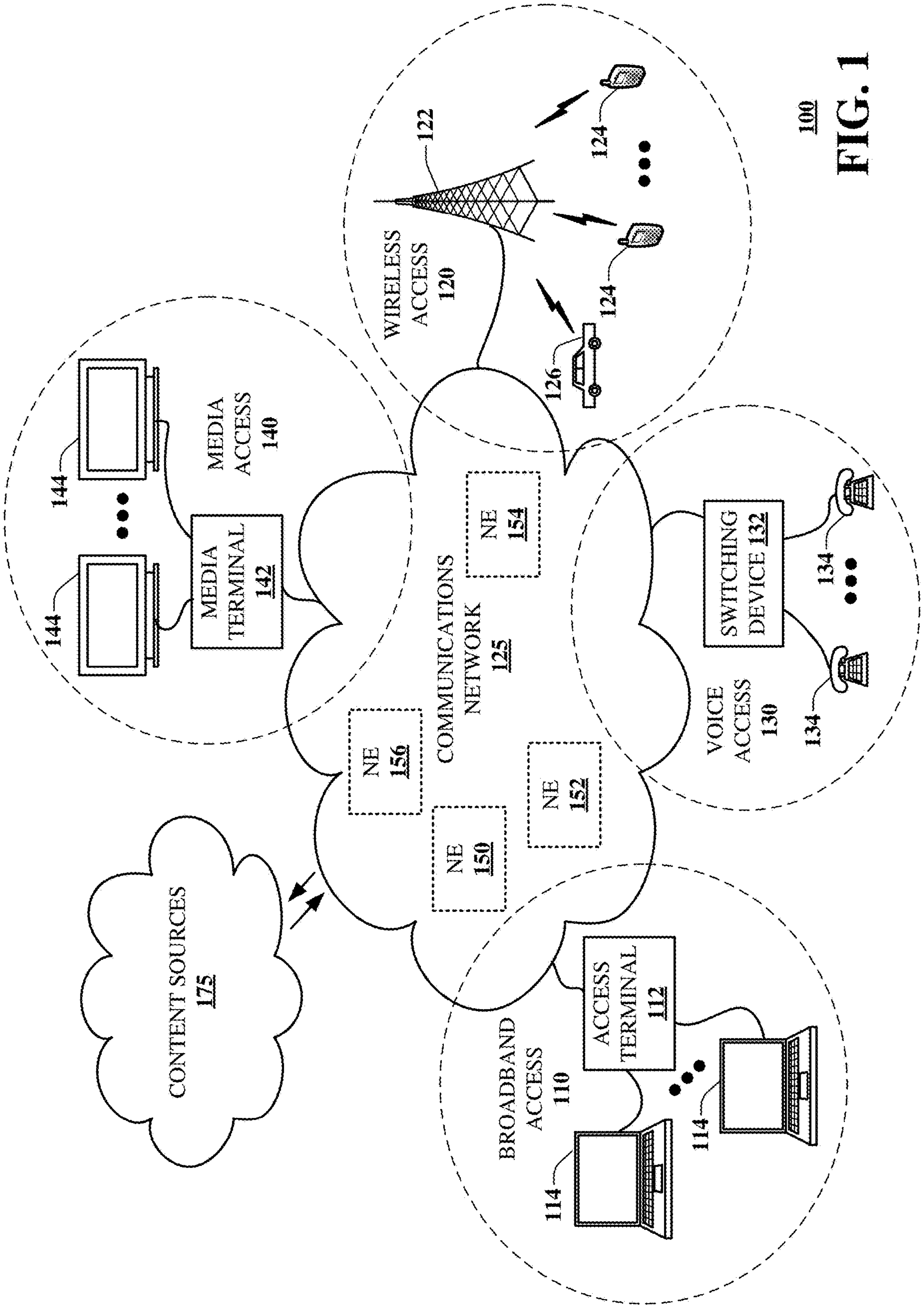
FIG. 1 is a block diagram illustrating an exemplary, non-limiting embodiment of a communications network in accordance with various aspects described herein.

The subject disclosure describes, among other things, illustrative embodiments for systems and methods facilitating configuration of router quality of service policies for prioritizing standalone network traffic. More specifically, the systems and methods utilize new differentiated services code point markings to prioritize certain data packets based on different and new communication standards such as a 5G standalone network, over a 5G non-standalone network, 4G LTE network, etc. Other embodiments are described in the subject disclosure.

One or more aspects of the subject disclosure are directed to a device including a processing system including a processor and a memory that stores executable instructions that, when executed by the processing system, facilitate performance of operations. The operations include receiving a first data packet via a first network access element of a standalone communication network; receiving a second data packet via a second network access element of a non-standalone communication network; detecting a first differentiated service code point (DSCP) value contained in the first data packet, wherein the first data packet is classified as a first class based on the first DSCP value; detecting a second DSCP value contained in the second data packet, wherein the second data packet is classified as a second class based on the second DSCP value; and prioritizing forwarding of the first data packet, to a router, over the second data packet when a determination is made that network congestion is occurring.

One or more aspects of the subject disclosure are directed to a non-transitory machine-readable medium, comprising executable instructions that, when executed by a processing system of a router including a processor, facilitate performance of operations. The operations include receiving data packets from a plurality of user equipment, wherein the data packets are classified according to markings configured to identify a class of service to which each packet belongs, wherein the class of service is associated with a quality of service that determines a priority treatment of each packet; detecting the markings of each packet and based on the detected markings, recognizing that each packet corresponds to standalone network traffic or non-standalone network traffic; and prioritizing forwarding of the standalone network traffic when a determination is made that bandwidth is limited.

One or more aspects of the subject disclosure A method including detecting, by a processing system of a router including a processor, first data packets utilizing a first communication platform; detecting, by the processing system of the router, second data packets utilizing a second communication platform; marking, by the processing system of the router, a class of service in the first data packets and in the second data packets, wherein the class of service is associated with a quality of service that determines a priority treatment of each data packet and the marking of the class of service is different between the first data packets and the second data packets to prioritize one of the first data packets and the second data packets whichever uses a newer communication platform between the first communication platform and the second communication platform; and scheduling, by the processing system of the router, to forward the first data packet and the second data packet, wherein the scheduling further comprises prioritizing the forwarding based on the marking of the class of service.

Referring now to FIG. 1, a block diagram is shown illustrating an example, non-limiting embodiment of a system 100 in accordance with various aspects described herein. For example, system 100 can facilitate in whole or in part systems and methods facilitating configuration of router quality of service policies for prioritizing standalone network traffic. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VOIP gateway or other gateway device and/or other switching device. The telephony devices 134 can include traditional telephones (with or without a terminal adapter), VOIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
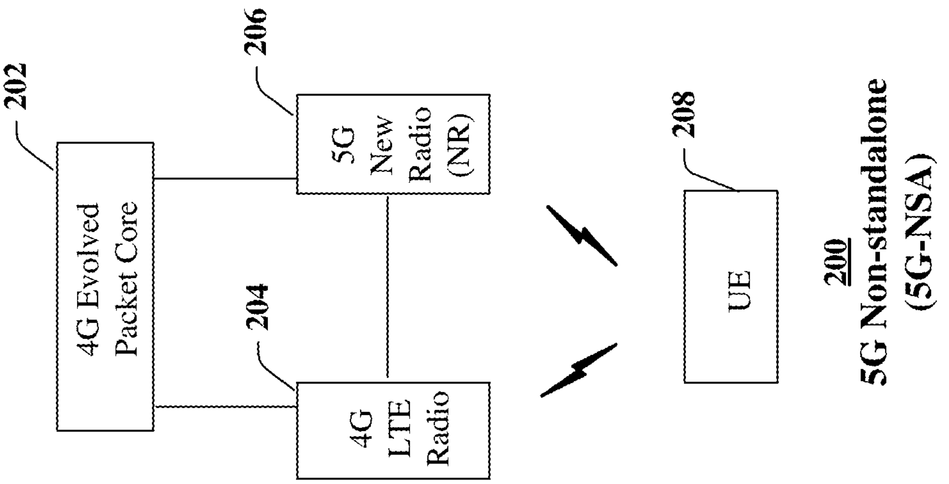
FIG. 2A is a block diagram illustrating 5G non-standalone network.
Figure 2B:
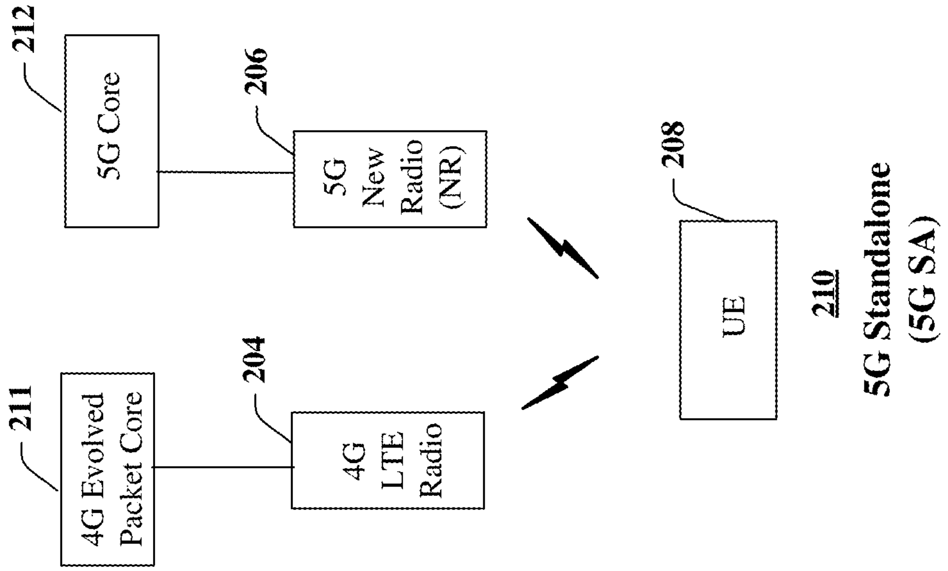
FIG. 2B is a block diagram illustrating 5G standalone network.

FIG. 2A is a block diagram illustrating 5G non-standalone network 200. FIG. 2B is a block diagram illustrating 5G standalone network 210. As depicted in FIG. 2A, service providers have deployed 5G in a hybrid mode referred to the 5G non-standalone network (5G NSA) 200. With the 5G NSA environment 200, service providers use 5G radio equipment 206 over a 4G LTE mobile core 202. The 5G standalone (5G SA) network 210 is a cellular infrastructure implemented and built specifically for 5G services based on 5G standards and protocols in access network 204, 206 and a mobile core 212. In FIG. 2A, the 5G access network 206 provides some benefits of 5G such as facilitating use of 5G frequencies, higher connection speeds, improved latency, etc., but the full-blown 5G features are not available, which can be provided by the 5G SA as depicted in FIG. 2B.

Unlike the 5G NSA network 200, the 5G standalone network 210 supports IoT use cases such as dense populations of sensors and controllers in smart buildings. The 5G SA network 210 also supports ultra-low-latency use cases that the 5G NSA network 200 may not, such as real-time control of unmanned aerial vehicles, autonomous vehicles, robotic equipment in a warehouse or factory, etc. More importantly, 5G SA supports network slicing, a deployment mode that enables different devices and customers to get dedicated network partitions, like virtual private cellular networks, with specified performance guarantees, such as minimum and maximum throughput rates. For instance, the 5G NSA network 200 may not support network slicing.

Migration to the 5G SA network 210 as depicted in FIG. 2B has been delayed across the industry. In certain cases, new 5G SA performance may be less than expected and in certain cases, less than performance under the 5G NSA. Performance of new services may be expected to at least be on-par or much better than older services to be successful and changed from older services. One reason that can explain the delayed migration to the 5G SA is not prioritizing the 5G SA network 210 over the 5G NSA network 200 in Router QoS (Quality of Service) policies. Most benefits of the 5G SA network 210 may be limited to be seen with ultra reliable low latency (URLL) in which higher traffic priorities can assist. A throughput may be sometimes less than 4G LTE/5G NSA network 200. Network investment has been and is in support 5G SA (e.g., Dark Fiber, Domain 2.0, Fronthaul Gateway (FHG), etc.). However, it may be costly to install and build a new transport infrastructure at the expense of older transport. Handset manufacturers (e.g., OEM) can be hesitant to enable the 5G SA network 210 by default. With the 5G SA network 210 disabled by a default, there may be a delay in facilitating a traffic shift to new technology and services such as the 5G SA network 210.

Figure 2C:
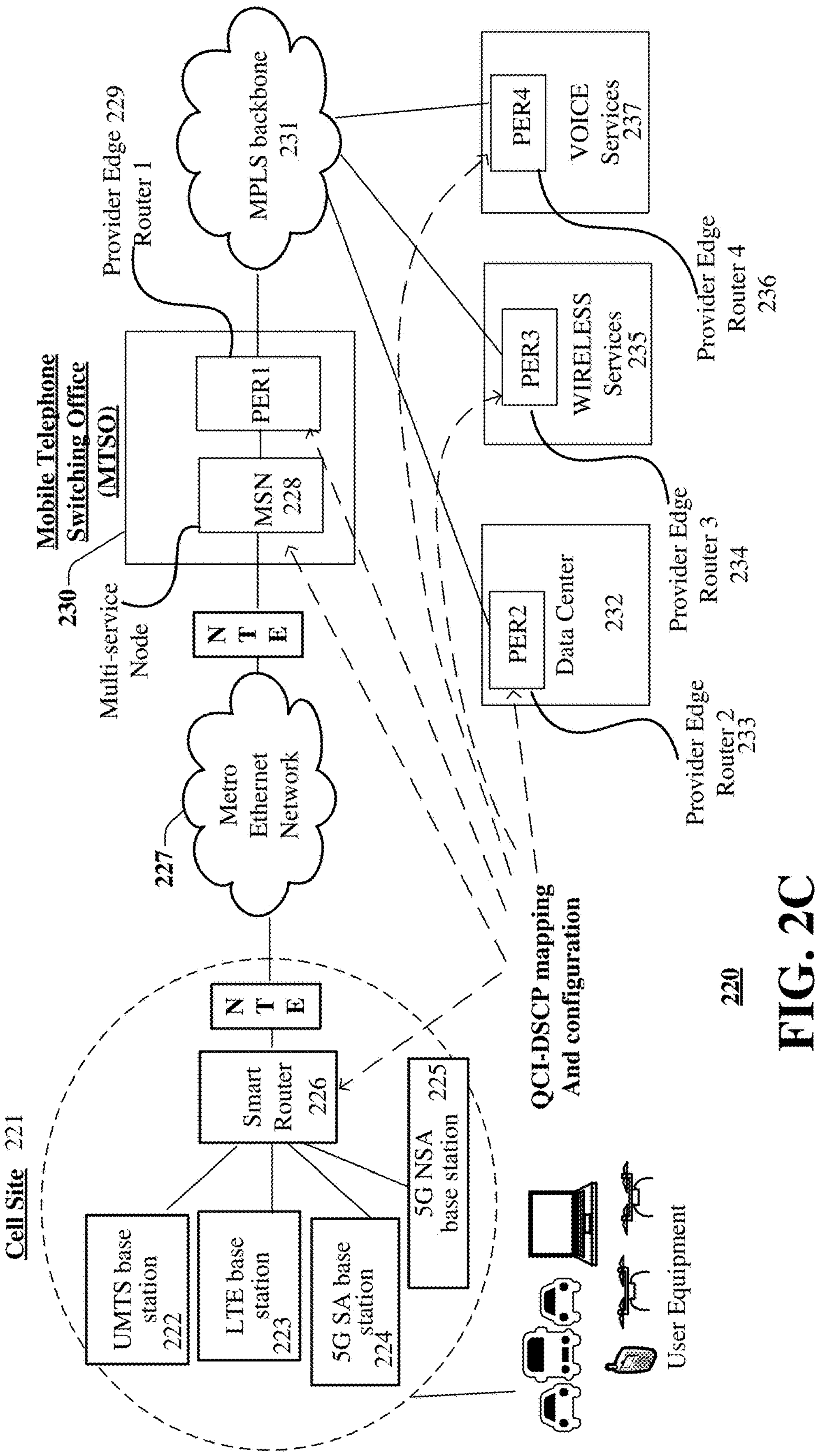
FIG. 2C is a block diagram illustrating an example, non-limiting embodiment of a system functioning within the communication network of FIG. 1 in accordance with various aspects described herein.

FIG. 2C is a block diagram illustrating an example, non-limiting embodiment of a system 220 functioning within the communication network of FIG. 1 in accordance with various aspects described herein. The system 220 facilitates traffic shift to new technology and services, such as 5G SA over 5G NSA. The system 220 implements different Router QoS policies to prioritize data traffic from the 5G SA network rather than older technology and services such as 5G NSA, 4G LTE, etc. The system 220 changes, adjusts or modify different router QoS policies to set higher priorities to data packets according to new technology and services. Router QoS policies have been set based on a type of data traffic such as voices, videos, etc. The system 220 implements router QoS policies to prioritize data traffic from a newer transport network in order to incentivize and facilitate migration to the newer transport network such as the 5G SA network 210 as shown in FIG. 2B.

In various embodiments, the system 220 includes a cell site 221 connected to a Metro Ethernet Network (MAN) 227 via a smart router 226. The MAN 227 is connected to a Mobile Telephone Switching Office (MTSO) which is connected to a Multi-protocol Label Switching (MPLS) backbone network 231. Various types of user equipment (UE), as depicted in FIG. 2C, are connected to wireless communication networks via the MAN 227, the MTSP 230 and the MPLS backbone 231 and receive various services such as data service 232, mobile services 235, data services 237, etc.

In various embodiments, the cell site 221 includes a Universal Mobile Telecommunications Service (UMTS) base station 223, an LTE base station 223, a 5G SA base station 224 and/or a 5G NSA base station 225, which are in communication with various types of UE as depicted in FIG. 2C by way of example. The 5G SA base station 224 and the 5G NSA base station 225 are included in and operated as a part of the 5G SA network 210 and the 5G NSA network 200, respectively, as depicted in FIGS. 2A and 2B. The smart router 226 serves as an integrated access device capable of integrating both voice and data services within a single device. The smart router 226 is placed at each cell site and aggregates multiple base stations at the cell site 221. The smart router 226 provides routing upstream toward a packet core. The smart router 226 can detect failure and reroute network traffic. The smart router 226 may be installed by a service provider to which a customer wishes to connect (e.g., AT&T). This allows the service provider to control the features of the access link and manage its operation during use. Service providers can offer access services over a variety of access technologies, including wireless optical and metro-Ethernet networks. The smart router 226 will aggregate its IP data traffic and different cell site traffic at the cell site 221 and pass the aggregated traffic along to a Multi-service node (MSN) 228 sitting in front of a provider edge router 1 (numeral 229) in the MTSO 230. The smart router 226 is acting as an IP router and will make a routing decision based on the IP address, and repackage the IP packet into a new Ethernet frame on a transport side.

In various embodiments, Ethernet networks transport traffic among two or more premises belonging to the same customer. For instance, Ethernet-based Metropolitan Area Networks (MAN) 227 currently operate and provide cost effective services on a per port basis. The Ethernet-based MANs 227 logically separate traffic received from different customers, providing data security and regulating network traffic to have equitable access. Network traffic are routed onto and off of the MAN 227 by each multi-service node (MSN) 228 to a Provider Edge Router (PER).

In various embodiments, the Mobile Telephone Switching Office (MTSO) 230 contains switching equipment or Mobile Switching Center (MSC) for routing mobile phone calls. The MTSO 230 also contains the equipment for controlling the cell sites 221 that are connected to the MSC. The systems in the MTSO 230 are responsible for interconnecting calls with the local and long distance landline telephone companies, compiling billing information, provide resources needed to efficiently serve a mobile subscriber such as registration, authentication, location updating and call routing.

In various embodiments, a service provider's common backbone network 231 is a large-scale IP/multiprotocol label switching (MPLS) network that carries all of the core IP traffic with a high degree of reliability and performance. The common backbone network 231 performs data collection, cleansing, analysis and storage.

In various embodiments, the system 220 includes a plurality of provider edge routers (PERs). A provider edge router (PER) is configured to route traffic between the service provider's area and areas administered by other network providers such as internet service providers. As depicted in FIG. 2C, several provider edge routers, PER1 229, PER2 233, PER3 234 and PER4 236 are placed over the MPLS backbone network 231 by way of example only.

In various embodiments, the system 220 differentiates a quality of service for various classes of service for data packet transfer through the service provider network. Customers may subscribe to different services by the service provider network for handling data packets of different types of classes. The service provider may provide a quality of service by maintaining bandwidth availability for each class and policing each class to enforce the quality of service. To establish classes of service and quality of service for the classes, data packets between the cell site 221 and the provider edge routers PER1, PER2, PER3 and PER4 in FIG. 2C are marked by a sending router to be recognized by a receiving router. For example, the data packets may be transferred through an Internet Protocol (IP) between the provider edge routers such that a marking is included in a header of each IP packet.

Figure 2D:
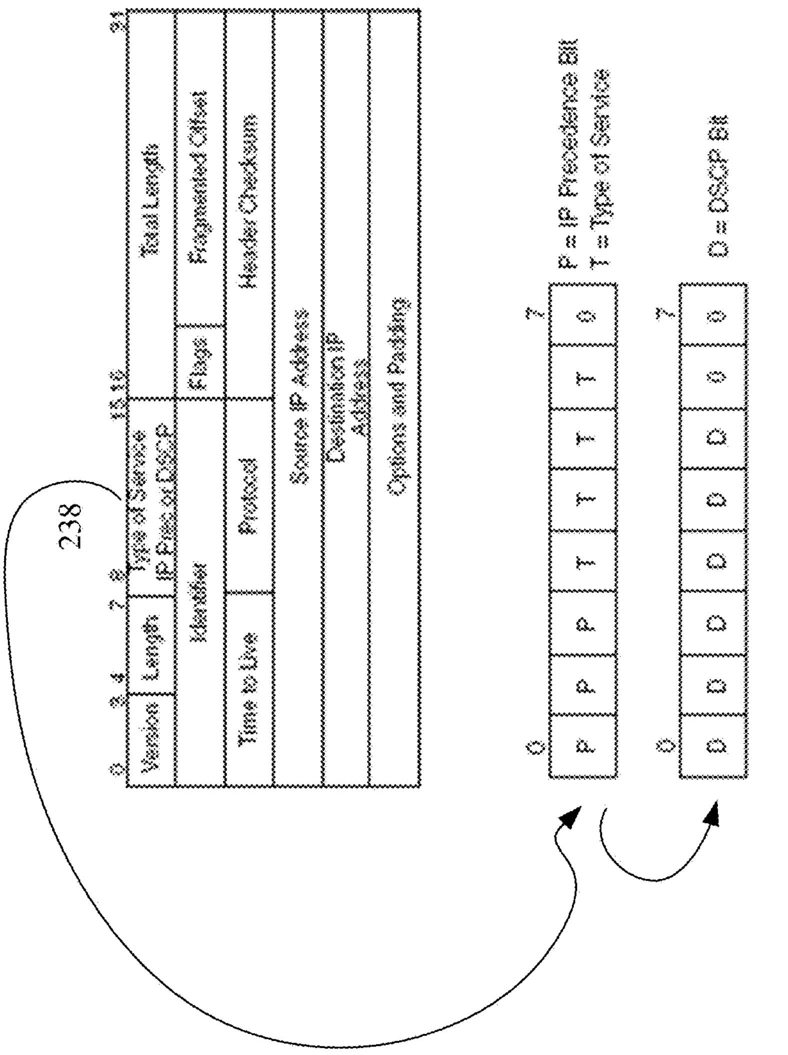
FIG. 2D depicts an example of an IP header of a data packet for use in various aspects described herein.

FIG. 2D depicts an example of an IP header of a data packet as used in various aspects described herein. A router or computer cannot determine the size of a packet and additional information may be required at an IP layer, in addition to source and destination IP addresses. As depicted in FIG. 2D, an IP header contains the information required to route data on the Internet, and has the same format regardless of the type of data being sent. Differentiated Service Code Point (DSCP) is a 6-bit field used to identify the level of service that a packet receives in the network. DSCP is a 3-bit expansion of IP precedence ("P") as ToS bits (Type of Service) have been eliminated. Routers can choose to use this DSCP field to give a preferential treatment to certain types of IP traffic. Routers use two of these values, 6 and 7, for routing protocol traffic. That leaves six values that can be used to prioritize user traffic. The first 3 bits of the DSCP value are the 3 bits from the IP precedence, as depicted in FIG. 2D. As one example, an IP precedence of 000 maps into a DSCP value of 000 000, and both represent best effort delivery. As another example, an IP precedence of 101 (Critical) maps into a DSCP value of 101 110 (High Priority or Expedited Forwarding (EF)). The remaining 4 IP precedence values are each mapped into 3 DSCP values. The additional 3-bit portion is used to identify a drop probability within one of the four assured forwarding (AF) classes.

In the context of IPV4, DSCP markings may be included based on RFC 791 in the Type of Service byte, which has been modified by RFC2474 and RFC 2475 as DSCP values. For instance, commonly used DSCP values include "46" (High Priority, Expediated Forwarding (EF)), "0" (Best Effort), "10" (AF11-Low drop probability), "34" (AF41-Low drop probability), "38" (AF43-High drop probability), etc.

In various embodiments, each class of service has a different marking to be included in the IP header, and the smart router 226 and the provider edge routers PER1 through PER4 are configured to recognize the same markings for the same classes of service, as depicted with dotted lines in FIG. 2C. A quality of service associated with the class of service is maintained during transfer through the MPLS backbone 231. The backbone network 231 utilizes the MPLS protocol, which utilizes a label marking scheme. The provider edge routers PER 1 through PER4 map between the DSCP marking from the cell site 221 and the MPLS marking of the backbone 231 network.

In various embodiments, each of the provider edge routers PER1~PER4 include a processor which implements policing a compliance of a quality of service (QoS) for the class of service by checking corresponding bandwidth and a label marking process. The provider edge routers PER1~PER4 include a memory that stores data including data packets being queued for transfer out of each provider edge router PER1~ PER4. The processor of each provider edge router PER1~ PER4 implements queues for various classes by recognizing the class from the markings of incoming data packets and queues the data packets accordingly in order to transfer out of each provider edge router PER1~ PER4.

In the 3GPP LTE networks, QoS Class Identifier (QCI) is used to ensure carrier traffic to be allocated with appropriate QoS. Different QoS has different QCI values, such as QCI value 9 being a default carrier for a UE for non-privileged subscribers. In the 3GPP LTE networks, preconfigured QCI values are mapped to DSCP values according to 3GPP TS23.203. For instance, QCI value 1 corresponds to conversational voice and has higher priority, QCI 5 corresponds to IMS (IP Multimedia Subsystem) signaling with top priority. As another example, wireless priority service, voice over LTE, etc. are assigned with QCI value 1 and mapped to DSCP values 32 and 46. If congestion may occur, a lowest priority level traffic (i.e., higher QCI values) will likely be dropped.

As described above, QCI values and DSCP mapped to QCI values have been used to prioritize data traffic based on a data type, such as voice, video, etc. Referring back to FIGS. 2A-2B, data packets from the 5G SA network 210 and the 5G NSA network 200 will have equal priority under the current QCI-DSCP mapping, when data traffic from the 5G SA network 210 and the 5G NSA network 200 include the same type of data such as voice. However, in various embodiments according to the present disclosure described herein, the system 220 implements the concept of Quality, Priority and Pre-emption to provide advantages to users utilizing the 5G SA network 210 over users using the 5G NSA network 200. Quality of Service (QOS) differentiation results in prioritized service offerings. QoS differentiation can be applied in various use cases.

Figure 2E:
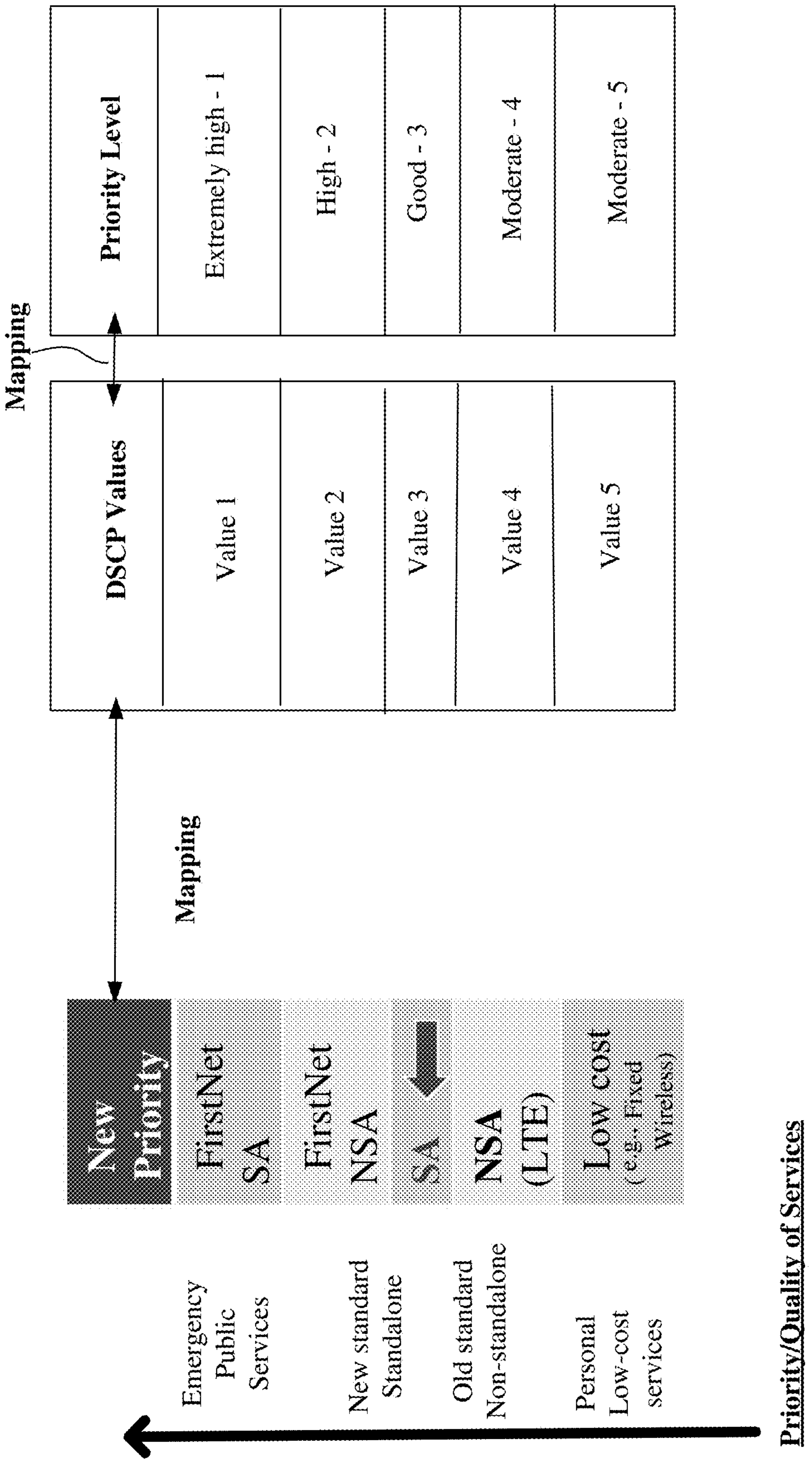
FIG. 2E depicts an illustrative embodiment of priority classes associated with a Quality of Service (QoS) in accordance with various aspects described herein.

FIG. 2E illustrates a non-limiting embodiment of QoS differentiation 250 using a DSCP mapping in accordance with various aspects described herein. By way of example, the QoS differentiation 250 can be applied to prioritize data packets in a standalone (SA) wireless communication framework over a non-standalone (NSA) wireless communication framework or a hybrid framework. For instance, the QoS differentiation 250 can be applied to prioritize the 5G SA network over the 5G NSA network, as depicted in FIG. 2E.

Additionally, or alternatively, the QoS differentiation 250 can be applied to prioritize, within the 5G SA, a particular service over other services. For instance, services directed to first responders, law enforcement officers, etc., (e.g., First-Net 5G SA) can be prioritized over other services directed to non-emergency situations (e.g., Low Cost/Fixed Wireless Services). As further another example, the QoS differentiation 250 can be applied to prioritize commercial services over individual services, public services over private services, premium services over low cost/low budget services (e.g., Fixed Wireless Services). The QoS differentiation 250 enables emergency service crews to receive and send data traffic fast and with high reliability, as compared to an individual downloading a movie.

In various embodiments, the QoS differentiation 250 can be applied to prioritize new communication standard(s) over existing or current communication standard(s). Using the above example, data traffic using the 5G SA network can be prioritized over data traffic using the 5G NSA network by providing a higher QoS the data traffic using the 5G SA network. Users or customers who sign up for the 5G SA network services can experience higher quality of services such as fast speed, low latency, extremely low call drops, etc. This QoS differentiation 250 uses differences between NSA and SA bearers to provide higher QoS (quality of service) to SA customers. The QoS differentiation 250 facilitates transition and migration from the 5G NSA based services to 5G SA based services as one example. As another example, the QoS differentiation 250 may further accommodate newer and higher communication standards which are continuously evolving and upcoming. By way of example only, the QoS differentiation 250 can be used to facilitate transition and migration from 6G standalone (SA) from 6G non-standalone (NSA), or next generation communication standards to be evolved from 6G or higher generation communication standards. The QOS differentiation 250 can serve as a flexible mechanism to accommodate transition and migration of current generation communication standards to newer and upcoming generation communication standards.

In various embodiments, the QoS differentiation 250 utilizes different DSCP mapping which are in turn mapped to different priority levels, as depicted in FIG. 2E. Existing transport networks map LTE bearers to similar DSCP (Differentiated Services Code Point) values which are also mapped to SA QoS. In various embodiments according to the present disclosure, current LTE bearers can be mapped to lower DSCP values (lower QoS), and SA bearers can be mapped to higher DSCP values, as depicted in FIG. 2E.

Referring back to FIG. 2C, the system 220 implements the QoS differentiation 250 using Differentiated Services Code Point (DSCP) marking. As described above in connection with FIG. 2D, DSCP is a means of classifying and managing network traffic and of providing quality of service (QOS) in layer 3 IP networks. DSCP is the six most significant bit of the DiffServ field. At a mobile core network, the DSCP marking feature enables, for example, the SMF (Session Management Function) of a 5G mobile core to perform traffic classification and prioritization to provide the appropriate quality of service (QOS) treatment.

In various embodiments, routers at the cell site 221 (e.g., the smart router 226) and at the provider edges (the provider edge routers PER1, PER2, PER3, PER4) include processing systems and memory to perform QCI-DSCP mappings and related configurations. FIG. 2E depicts the non-limiting example of QCI-DSCP mappings by way of example only for the purpose of description and the present disclosure is not limited thereto. The processing systems of the provider edge routers implement relevant queues to reflect a corresponding priority level based on the QCI-DSCP mapping, such that high priority data packets can be forwarded with a very low latency and with a very low drop probability.

Figure 2F:
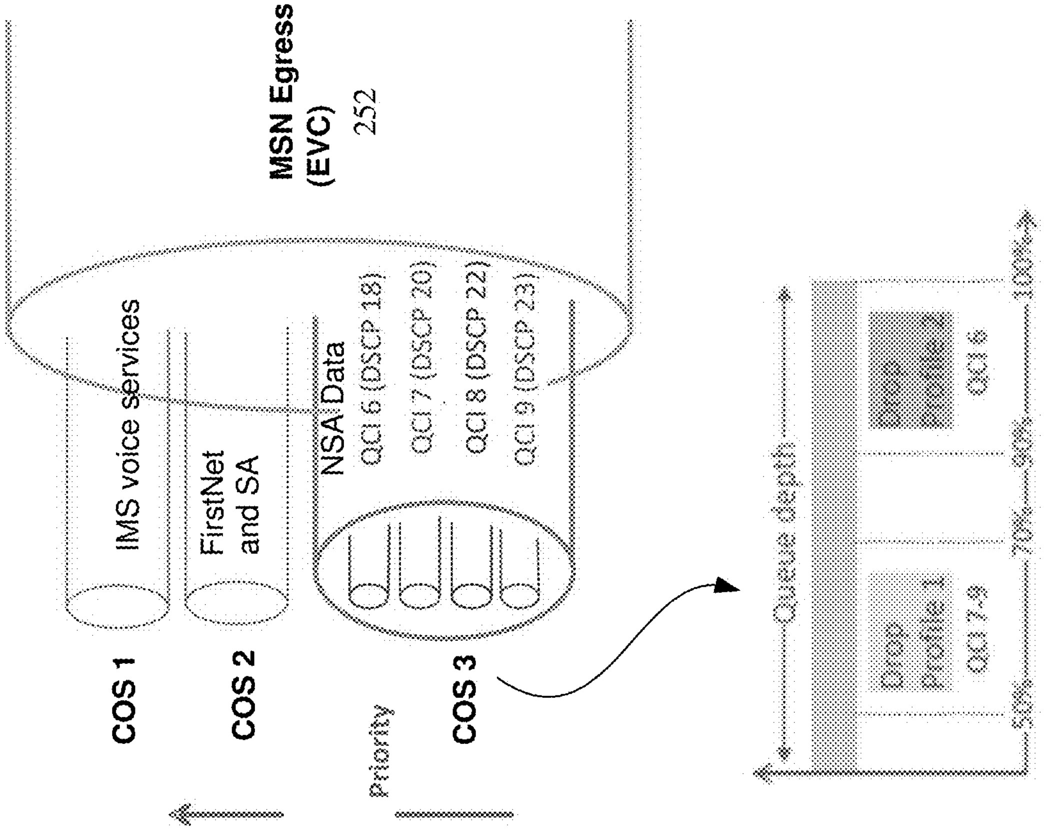
FIG. 2F depicts another illustrative embodiment of priority classes associated with different QoS levels at an Ethernet virtual circuit in accordance with various aspects described herein.

FIG. 2F illustrates a non-limiting embodiment of a QoS differentiation 254 in accordance with various aspects described herein. By way of example, FIG. 2F depicts an Ethernet virtual circuit (EVC) at an MSN egress port. The EVC is configured as a service pipe within a service provider network. The EVC can be associated with one or more bandwidth profiles and with one or more forwarding treatment rules for its frames. From a quality of service (QOS) perspective, a single QoS EVC provides a single bandwidth profile and a single forwarding treatment for all frames within the EVC. A multiple CoS EVC (CoS: Class of Service) provides a single bandwidth profile and multiple forwarding treatments for all frames within the EVC. A multiple QOS EVC provides multiple bandwidth profiles and multiple forwarding treatments for all frames within the EVC. FIG. 2F illustrates a non-limiting example of the multiple QoS EVC. The bandwidth profile is used for resource reservation and allocation, admission control and traffic policing and is a control plane function, described below in detail. The forwarding treatment indicates scheduling and discard treatment of the frame. Forwarding treatment is specified by the per hop behavior (PHB) assignments to the frame and is based on an EVC type.

Referring to FIG. 2F, for instance, by way of example only, there are three classes of services, COS1, COS2 and COS3, where COS1 has a highest priority level and COS3 has a lowest priority level. For instance, IMA voice services are associated with COS1, Emergency Services using the 5G SA network associated with COS2, and NSA data associated with COS3. For COS3 level, several QCI levels are associated with COS 3, such as QCI 6, QCI 7, QCI 8 and QCI 9 corresponding to different DSCP values, 18, 20, 22 and 23, respectively. FIG. 2F also illustrates an exemplary queue depth in percentage in connection with COS3 level, i.e., QCI levels 6 through 9. QCI levels 7-9 are subject to Drop Profile 1, and QCI level 6 is subject to Drop Profile 2, respectively. Data packets marked with QCI level 6 are more likely to be forwarded than data packets marked with QCI levels 7-9.

Additionally, or alternatively, FIG. 2F illustrates the EVC off of one physical port, often divided into sub-interfaces or Virtual Local Area Networks (VLANs). In FIG. 2F, each pipe associated with COS1, COS2 and COS3 can correspond to each VLAN assigned with a different QoS for each VLAN. By way of example, one VLAN is assigned to carry mostly voice traffic, while another VLAN carries mostly video. Regardless of a type of data carried in each VLAN, classification of services (and priority level/QCI values) can still prioritize newer generation standalone. There may be no need to bottleneck video VLANs if voice VLANs get bottlenecked.

Figure 2G:
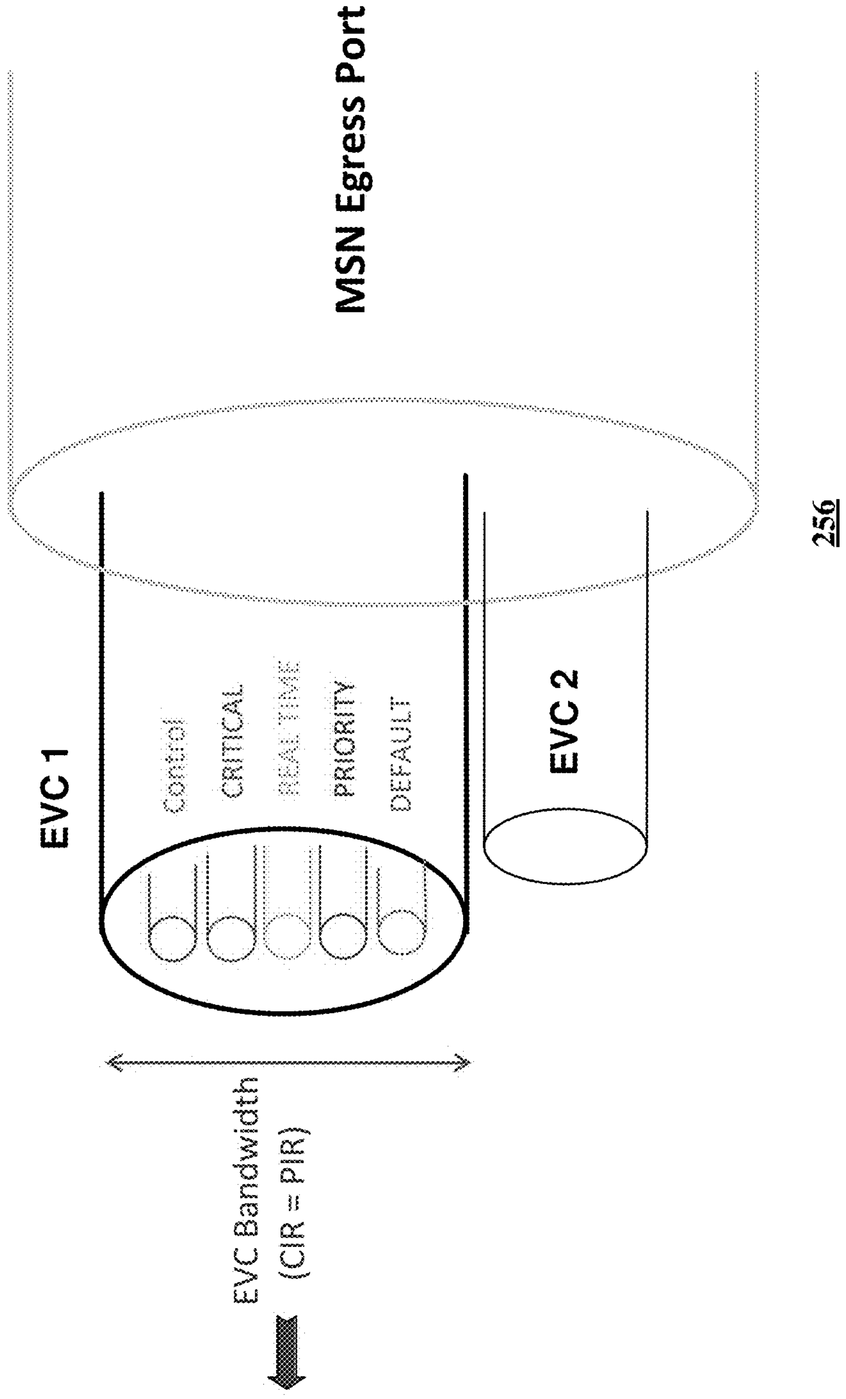
FIG. 2G depicts an illustrative embodiment of priority commands associated with a QoS at Ethernet virtual circuits arranged in a router egress port in accordance with various aspects described herein.

FIG. 2G depicts an illustrative embodiment of priority command 256 associated with a QoS in accordance with various aspects described herein. By way of example, priority commands can be enforced for a QoS class: Control, Critical, Real-Time, Priority, and Default, as depicted in FIG. 2G.

FIG. 2G illustrates an MSN egress port including EVC1 and EVC2 by way of example only. A bandwidth of EVC1 has a condition that Peak Information Rate (PIR) corresponds to Committed or Capped Information Rate (CIR). Typical computation of the bandwidth at a backhaul provider's switch and a Multi-service node and a smart router (as depicted in FIG. 2C) are done at Layer 2. For shaping data traffic at EVC1, a hierarchical QoS can be allocated, such as Control signal for routers, Critical, Real Time, Priority and Default, as depicted in FIG. 2G, by way of example only. It is implemented to shaping total data traffic to PIR and trigger QoS-based queuing when EVC1 reaches PIR or a particular shape rate. For egress buffers, QoS levels such as Critical, Real Time, can use strict-priority queuing, and all other classes may use Weighed Fair Queueing (WFQ). Queueing is a network scheduling mechanism and fair queuing shares bandwidth equally. WFQ allows schedules to be specific, for each flow, which fraction of bandwidth will be given. In certain embodiments, a choice of weights can be left to a network administrator or a service provider. WFQ can be utilized for controlling a QoS, for example, meeting guaranteed data rate.

Tables 1 and 2 below show egress queue sizing and weighted random early detection (WREN) thresholds for each bandwidth (BW) range and class of service (Cos), such as Local Control, Critical, Real-Time, etc. (the highest priority to the least priority).

TABLE 1

| Egress Queue-Limit | | | |
|---|---|---|---|
| | Queue-Limit (ms) | | |
| Class | BW ≤ 1 G | 1 G < BW ≤ 10 G | 10 G < BW ≤ 100 G |
| Local Control | 5 ms | 2 ms | 1 ms |
| Critical (Synch) | 5 ms | 2 ms | 1 ms |
| Real-Time | 10 ms | 5 ms | 2 ms |
| Priority | 50 ms | 10 ms | 5 ms |
| Default | 50 ms | 10 ms | 5 ms |

TABLE 2

| WRED Thresholds | | | | | | |
|---|---|---|---|---|---|---|
| Priority | 1 G | | 10 G | | 100 G | |
| Group | Min | Max | Min | Max | Min | Max |
| Low | 25 ms | 35 ms | 5 ms | 7 ms | 2 ms | 3 ms |
| High | 45 ms | 50 ms | 9 ms | 10 ms | 4 ms | 5 ms |

WRED is a queueing discipline for a network scheduler in order to avoid congestion. WRED operates that a single queue may have several different sets of queue thresholds, where each threshold set is associated to a particular traffic class. For example, a queue may have lower thresholds for lower priority packets. A queue buildup will cause lower priority packets to be dropped, thereby protecting higher priority packets in the same queue. In this way, quality of service prioritization can be accommodated for important packets from a pool of packets using the same buffer. It is more likely that standard traffic will be dropped instead of higher prioritized traffic In various embodiments, referring back to FIGS. 2F and 2G, COS1, COS2 and COS3 and additionally, control signals for routers correspond to MSN Egress traffic classes. The MSN Egress traffic classes are mapped to traffic classes such as WPS Sync, Priority Data and Default Data, and Real Time. Different DSCP values and Diff-Serve classes are mapped to these classes. As Egress traffic classes and D2 traffic classes change, different DSCP values and different Service Class (Diff-class) can be used or assigned. Using the examples in FIG. 2E, MSN Egress traffic classes can be designed to Emergency services (FirstNet) SA (COS1), Emergency services (FirstNet) NSA (COS2), NSA (COS3), which correspond to WPS Sync, Priority Data and Default Data as D2 Traffic Class. Different DSCP values can be selected and associated with these classes at the MSN and the D2 traffic.

In various embodiments, the MSN egress port has been described in connection with FIGS. 2F and 2G, but the QoS design implementation described with the MSN egress port can apply to the smart router, PER1~PER4 and network elements deployed in a cell site backhaul network.

Figure 2H:
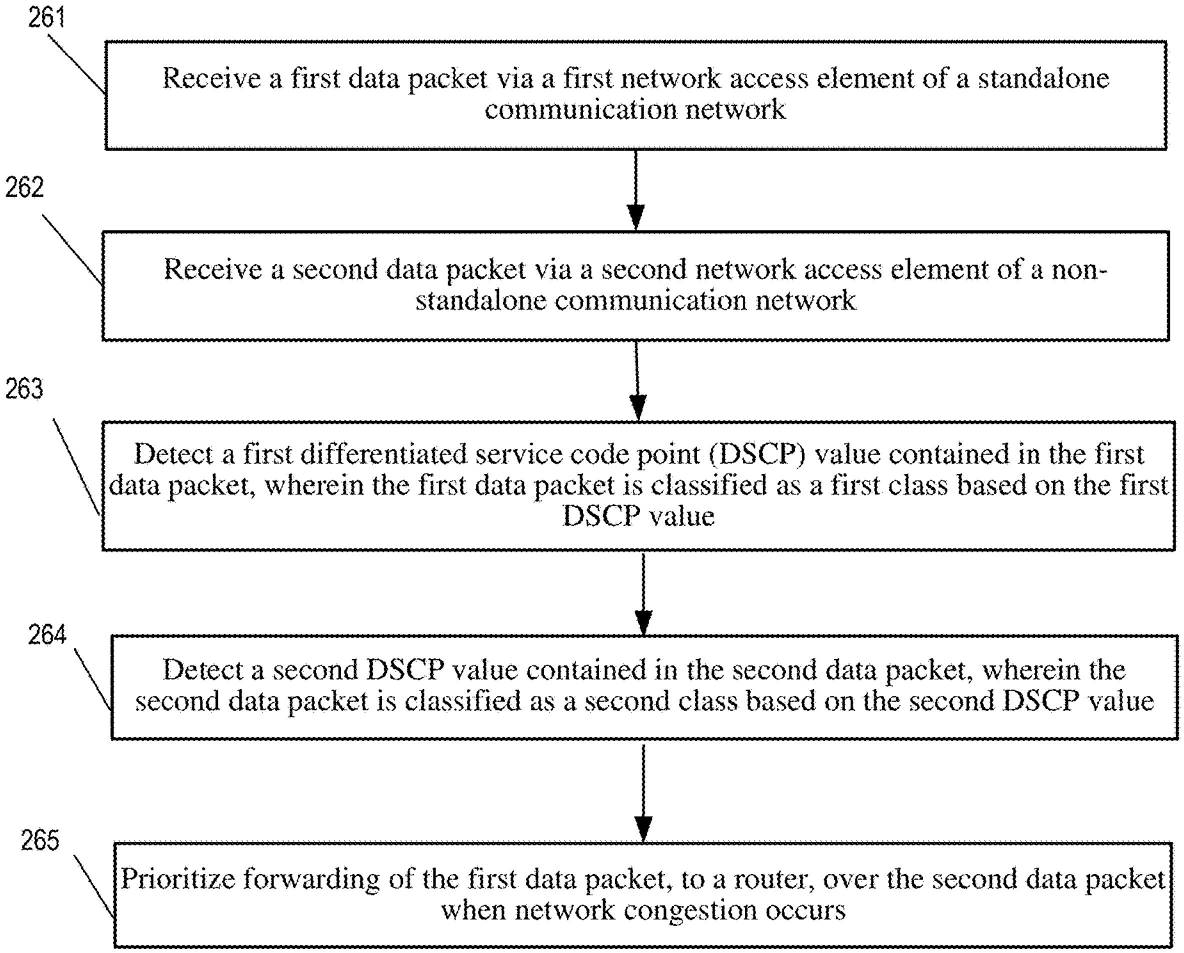
FIG. 2H depicts an illustrative embodiment of a method in accordance with various aspects described herein.

FIG. 2H depicts an illustrative embodiment of a method 260 in accordance with various aspects described herein. The method 260 includes receiving a first data packet via a first network access element of a standalone communication network (Step 261), receiving a second data packet via a second network access element of a non-standalone communication network (Step 262), detecting a first differentiated service code point (DSCP) value contained in the first data packet, wherein the first data packet is classified as a first class based on the first DSCP value (Step 263), and detecting a second DSCP value contained in the second data packet. The second data packet is classified as a second class based on the second DSCP value (Step 264). The method 260 further includes prioritizing forwarding of the first data packet, to a router, over the second data packet when network congestion occurs (Step 265). The prioritizing the first data packet further comprises forwarding the first data packet with a latency lower than the second data packet.

In various embodiments, the first class is associated with a quality of service (QoS) corresponding to a priority level and the second class is associated with the QoS corresponding to a default level. Additionally or alternatively, the first class is associated with a quality of service (QOS) corresponding to a first queue limit and the second class is associated with the QoS corresponding to a second queue limit longer than the first queue limit. The first class is associated with the QoS allocating bandwidth greater than bandwidth assigned to the second class. The standalone communication network includes a 5G standalone network and the non-standalone communication network includes a 5G non-standalone standard network.

In various embodiments, the method 260 further include receiving a third data packet marked with a third DSCP value according to a Nth generation communication standard, receiving a fourth data packet marked with a fourth DSCP value according to a (N+1)th generation communication standard, where N is an integer equal to or greater than four, detecting the third DSCP value classifying the third data packet to belong to a non-priority class, detecting the fourth DSCP value classifying the fourth data packet to belong to a priority class, and scheduling to prioritize a forwarding of the fourth data packet over the third data packet when network bandwidth is limited. The third data packet is transmitted using a 4G network or a 5G non-standalone network and the fourth data packet is transmitted using a 5G standalone network.

Figure 2I:
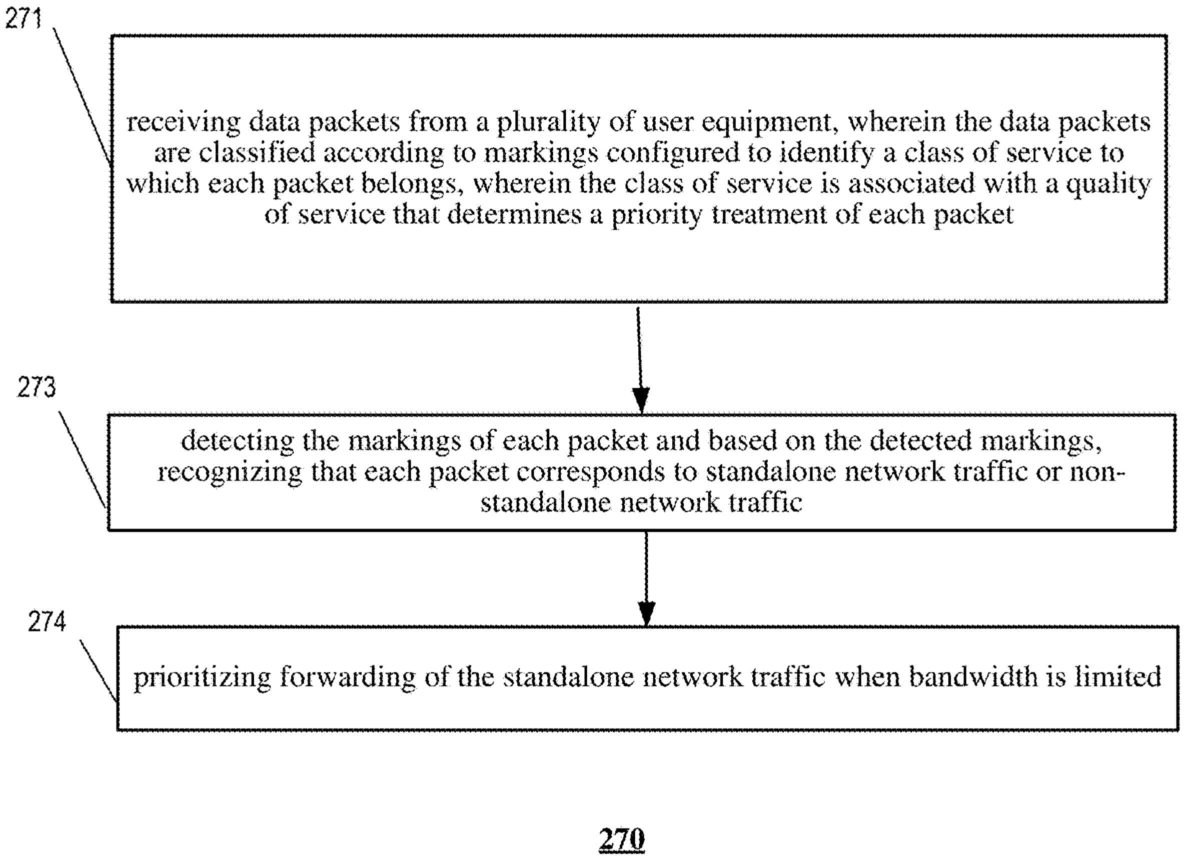
FIG. 2I depicts an illustrative embodiment of another method in accordance with various aspects described herein.

FIG. 2I depicts an illustrative embodiment of a method 270 in accordance with various aspects described herein. The method 270 include receiving data packets from a plurality of user equipment, where the data packets are classified according to markings configured to identify a class of service to which each packet belongs (Step 271). The identified class of service (Step 271) is associated with a priority command including one of real time, priority and default. The class of service is associated with a quality of service that determines a priority treatment of each packet (Step 273). The detected markings (Step 273) contain a differentiated service code point (DSCP) value which is mapped to a Quality of Service Class Indicator (QCI). The method 270 further includes detecting the markings of each packet and based on the detected markings, recognizing that each packet corresponds to standalone network traffic or non-standalone network traffic (Step 273) and prioritizing forwarding of the standalone network traffic when bandwidth is limited (Step 274).

In various embodiments, the method 270 further includes determining a configurable queue limit to be associated with the priority command, the configurable queue limit varying depending on the standalone network traffic or non-standalone network traffic, where the configurable queue limit further varies based on bandwidth. The method 270 further includes scheduling to forward the standalone network traffic for use with a network slice with a latency lower than the non-standalone network traffic for use the same network slice, and scheduling to prioritize a specific service using a standalone network over a same specific service using a non-standalone network.

Figure 2J:
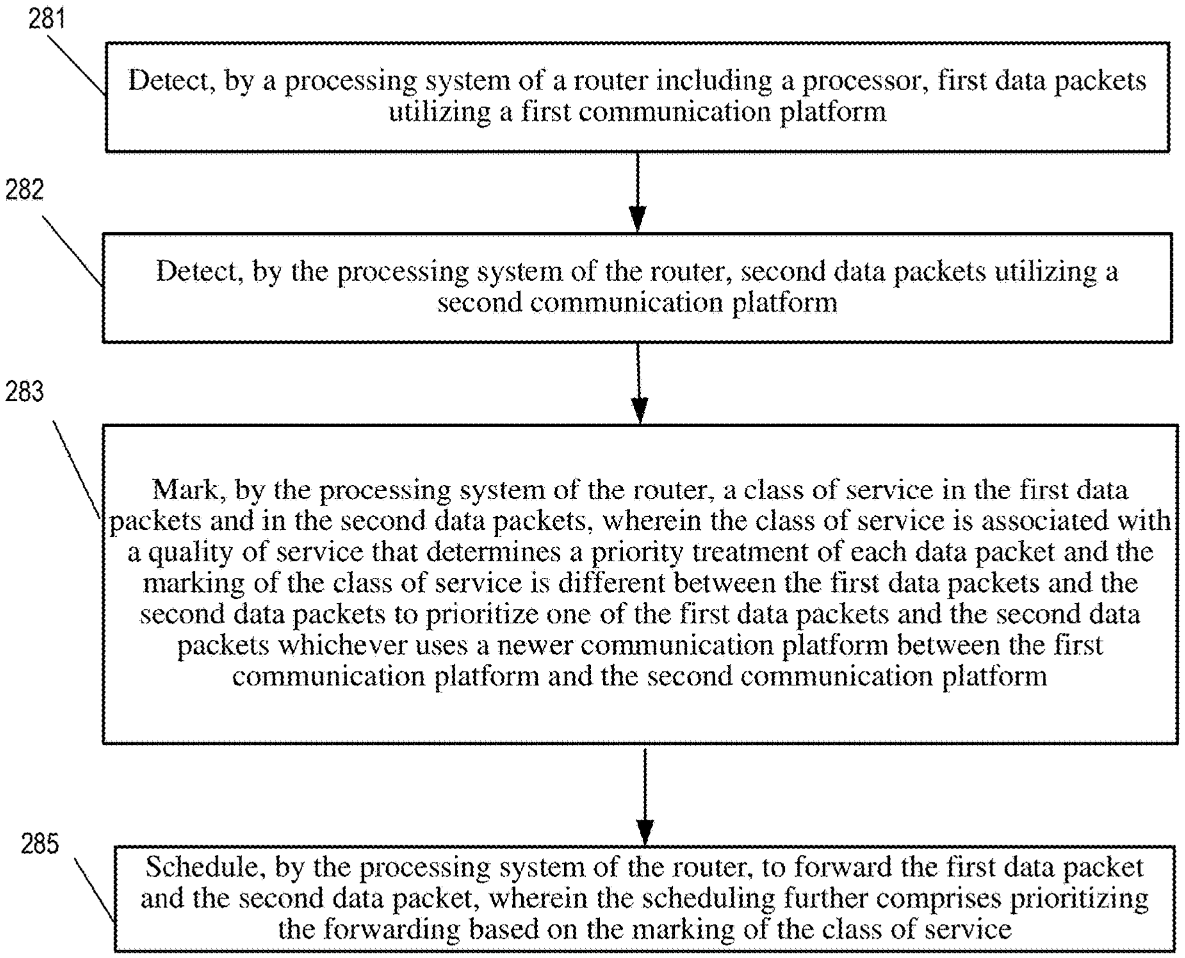
FIG. 2J depicts an illustrative embodiment of further another method in accordance with various aspects described herein.

FIG. 2J depicts an illustrative embodiment of a method 280 in accordance with various aspects described herein. The method 280 includes detecting, by a processing system of a router including a processor, first data packets utilizing a first communication platform (Step 281), detecting, by the processing system of the router, second data packets utilizing a second communication platform (Step 282), and marking, by the processing system of the router, a class of service in the first data packets and in the second data packets (Step 283). The class of service is associated with a quality of service that determines a priority treatment of each data packet and the marking of the class of service is different between the first data packets and the second data packets to prioritize one of the first data packets and the second data packets whichever uses a newer communication platform between the first communication platform and the second communication platform (Step 283). The method 280 further includes scheduling, by the processing system of the router, to forward the first data packet and the second data packet (Step 285). The scheduling further comprises prioritizing the forwarding based on the marking of the class of service.

In various embodiments, the method 280 further includes determining the priority treatment of each data packet based on the marked class of service and queuing, by the processing system of the router, the first data packets and the second data packets in an egress buffer based on the determined priority treatment. Additionally, or alternatively, the first communication platform is configured to implement a Nth generation communication standard and the second communication platform is configured to implement a (N+1)th generation communication standard. The scheduling (Step 285) further comprises prioritizing the forwarding of the second data packets when data traffic at an egress port of the router reaches a Peak Information Rate (PIR).

In various embodiments, the method 280 further includes allocating a first differentiated service code point (DSCP) value to the first data packets; and allocating a second DSCP value to the second data packets. The second DSCP value is recognized to classify the second data packets as having a quality of service class indicator (QCI) higher than a QCI associated with the first data packets. The marking the class of service (Step 283) further comprises configuring an internet protocol (IP) header of each data packet to mark a DSCP value corresponding to the class of service of each data packet. The method 280 further includes triggering, by the processing system of the router, a class-based queuing of the first data packets and the second data packets based on the marked DSCP value. The method 280 further includes configuring, by the processing system of the router, a mapping between a DSCP value and a QCI with respect to the class of service, where the mapping between the DSCP value and the QCI changes to reflect changes in the first communication platform, the second communication platform or both.

While for purposes of simplicity of explanation, the respective processes are shown and described as a series of blocks in FIGS. 2H, 2I and 2J, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
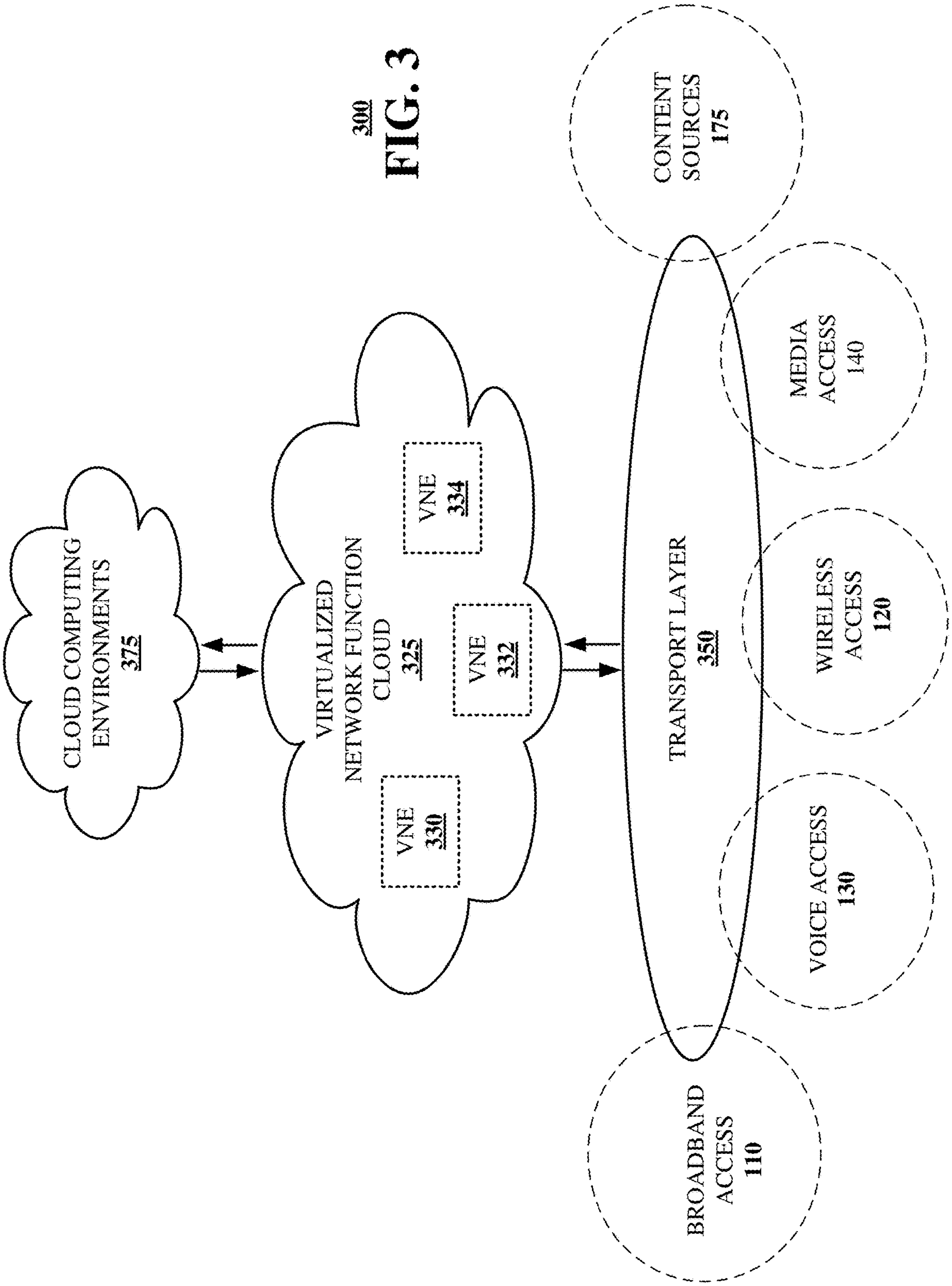
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200, and method 230 presented in FIGS. 1, 2A, 2B, 2C, and 3. For example, virtualized communication network 300 can facilitate in whole or in part systems and methods facilitating configuration of router quality of service policies for prioritizing standalone network traffic.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements-which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
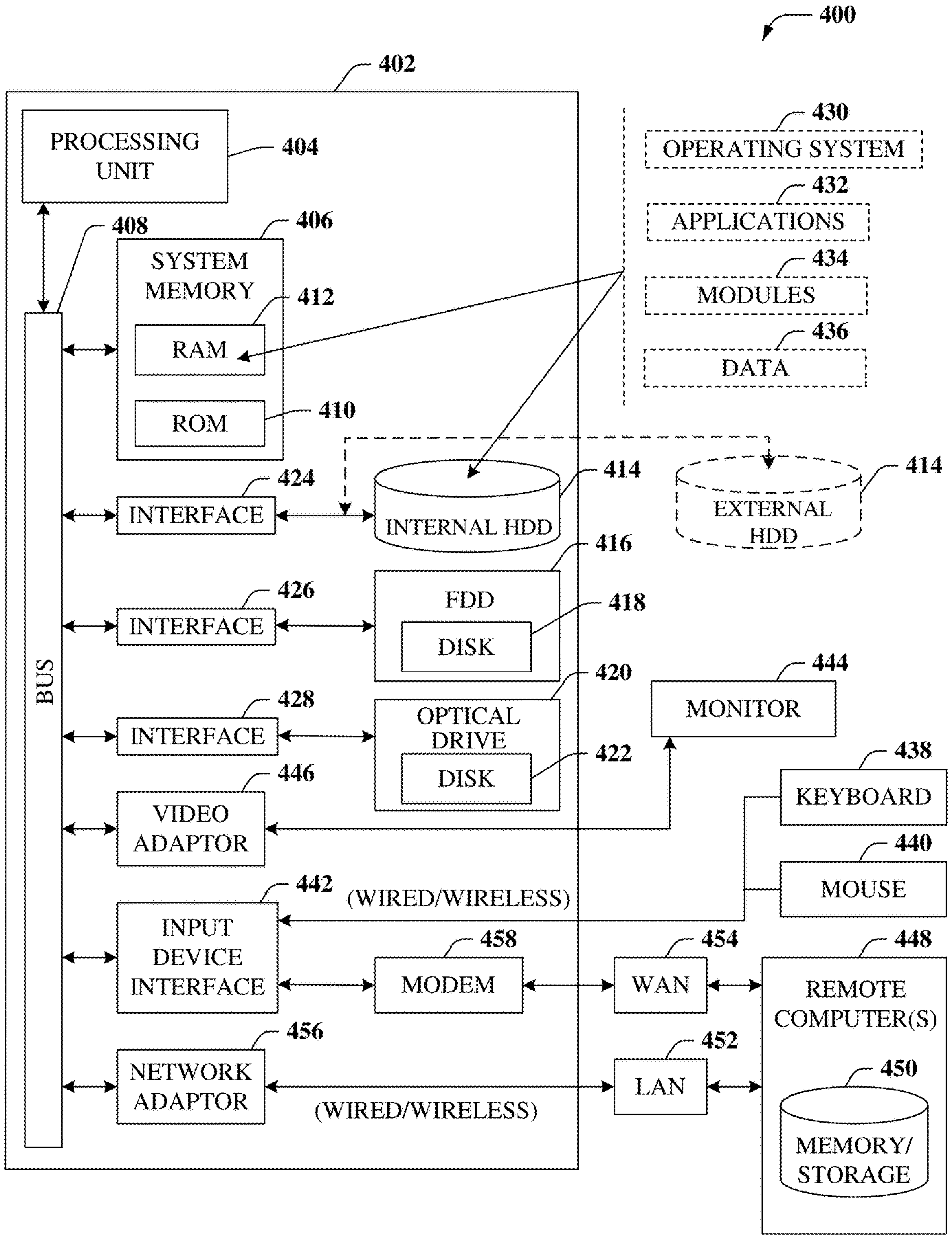
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part systems and methods facilitating configuration of router quality of service policies for prioritizing standalone network traffic.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
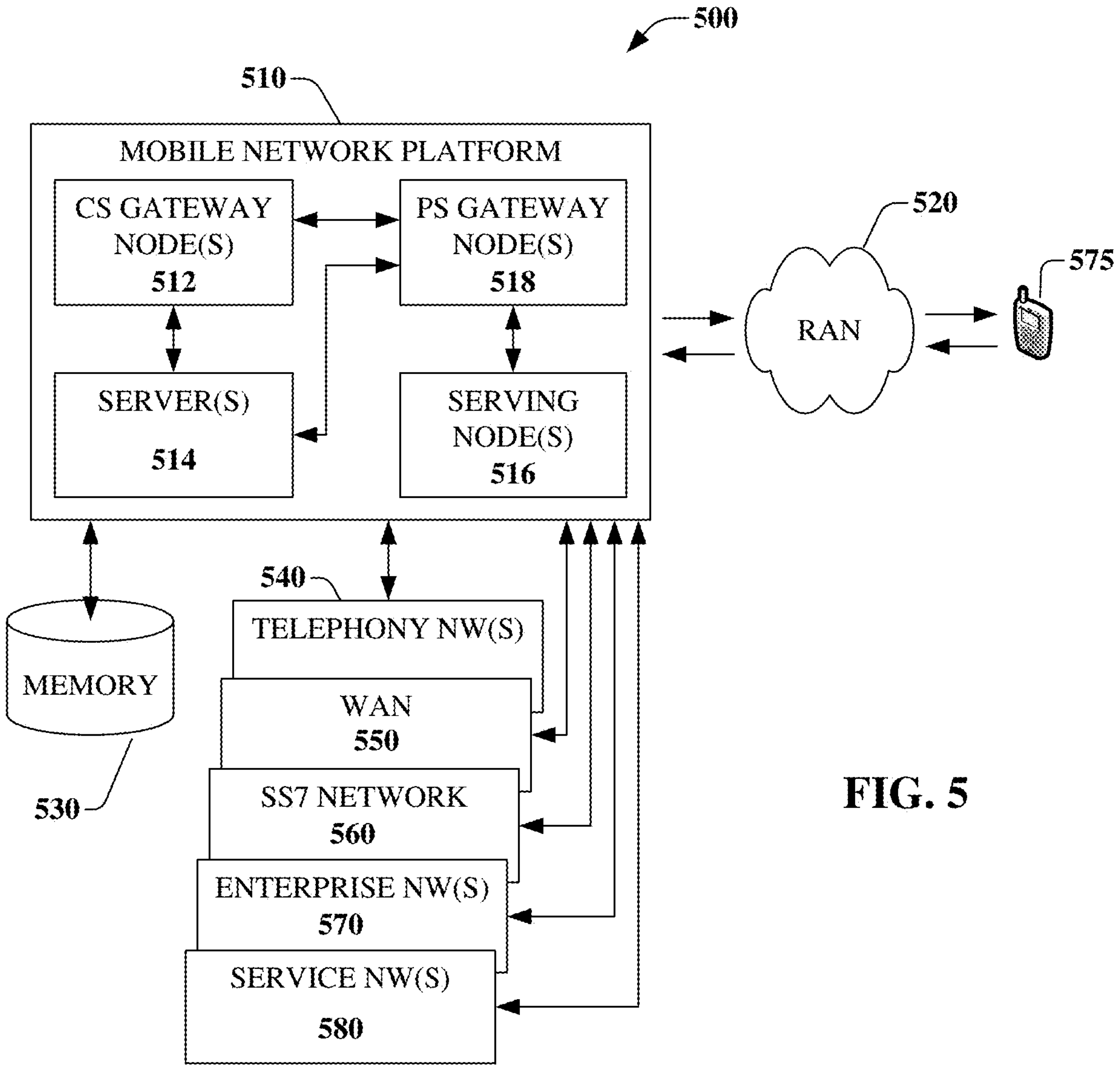
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part systems and methods facilitating configuration of router quality of service policies for prioritizing standalone network traffic. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
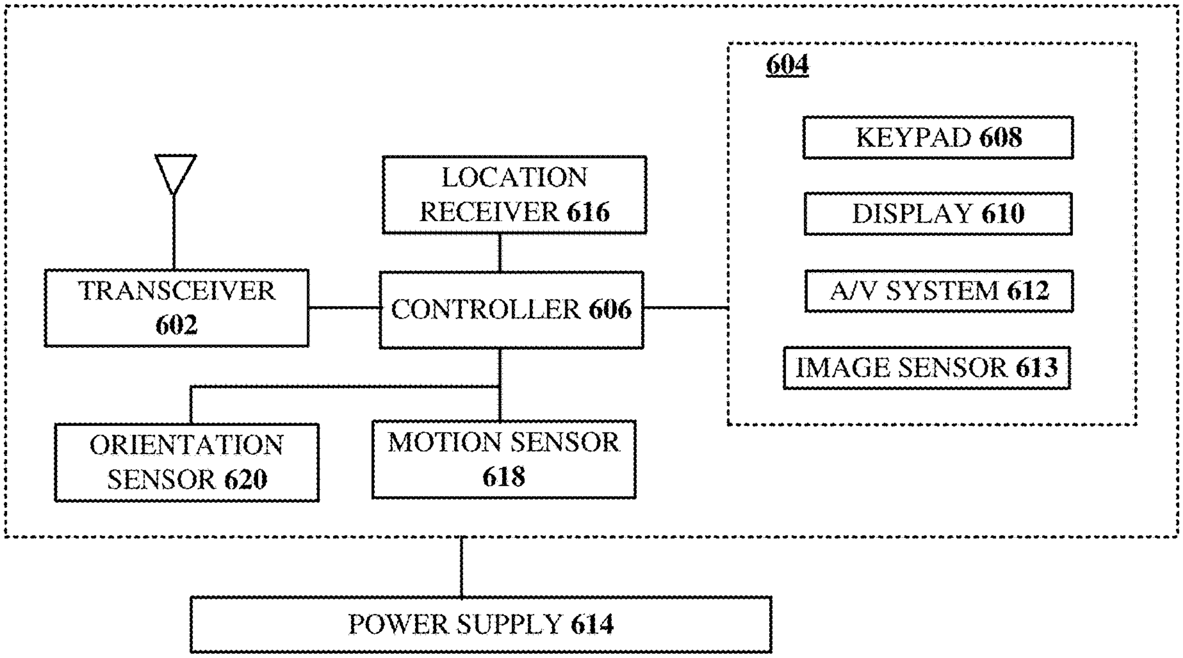
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part systems and methods facilitating configuration of router quality of service policies for prioritizing standalone network traffic.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/

GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VOIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human car) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and cast, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, f(x)=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:

a processing system including a processor; and a memory that stores executable instructions that, when executed by the processing system, facilitate performance of operations, the operations comprising:

receiving a first data packet via a first network access element of a standalone communication network;

receiving a second data packet via a second network access element of a non-standalone communication network;

detecting a first differentiated service code point (DSCP) value contained in the first data packet, wherein the first data packet is classified as a first class based on the first DSCP value;

detecting a second DSCP value contained in the second data packet, wherein the second data packet is classified as a second class based on the second DSCP value; and prioritizing forwarding of the first data packet, to a router, over the second data packet when a determination is made that network congestion is occurring.

2. The device of claim 1, wherein the first class is associated with a quality of service (QOS) corresponding to a priority level and the second class is associated with the QoS corresponding to a default level.

3. The device of claim 1, wherein the first class is associated with a quality of service (QOS) corresponding to a first queue limit and the second class is associated with the QoS corresponding to a second queue limit longer than the first queue limit.

4. The device of claim 3, wherein the first class is associated with the QoS for allocating bandwidth greater than bandwidth assigned to the second class.

5. The device of claim 3, wherein the prioritizing the first data packet further comprises forwarding the first data packet with a latency lower than the second data packet.

6. The device of claim 1, wherein the standalone communication network includes a 5G standalone network and the non-standalone communication network includes a 5G non-standalone standard network.

7. The device of claim 1, wherein the operations further comprise:

receiving a third data packet marked with a third DSCP value according to a Nth generation communication standard;

receiving a fourth data packet marked with a fourth DSCP value according to a (N+1)th generation communication standard, wherein N is an integer equal to or greater than four;

detecting the third DSCP value classifying the third data packet to belong to a non-priority class;

detecting the fourth DSCP value classifying the fourth data packet to belong to a priority class; and schedule to prioritize a forwarding of the fourth data packet over the third data packet when network bandwidth is limited.

8. The device of claim 7, wherein the third data packet is transmitted using a 4G network or a 5G non-standalone network and the fourth data packet is transmitted using a 5G standalone network.

9. A non-transitory machine-readable medium, comprising executable instructions that, when executed by a processing system of a router including a processor, facilitate performance of operations, the operations comprising:

receiving data packets from a plurality of user equipment, wherein the data packets are classified according to markings configured to identify a class of service to which each packet belongs, wherein the class of service is associated with a quality of service that determines a priority treatment of each packet;

detecting the markings of each packet and based on the detected markings, recognizing that each packet corresponds to standalone network traffic or non-standalone network traffic; and prioritizing forwarding of the standalone network traffic when a determination is made that bandwidth is limited.

10. The non-transitory machine-readable medium of claim 9, wherein the detected markings contain a differentiated service code point (DSCP) value which is mapped to a Quality of Service Class Indicator (QCI).

11. The non-transitory machine-readable medium of claim 9, wherein the identified class of service is associated with a priority command including one of real time, priority and default.

12. The non-transitory machine-readable medium of claim 11, wherein the operations further comprise determining a configurable queue limit to be associated with the priority command, the configurable queue limit varying depending on the standalone network traffic or non-standalone network traffic, wherein the configurable queue limit further varies based on bandwidth.

13. The non-transitory machine-readable medium of claim 9, wherein the operations further comprise:

scheduling to forward the standalone network traffic for use with a network slice with a latency lower than the non-standalone network traffic for use the same network slice; and scheduling to prioritize a specific service using a standalone network over a same specific service using a non-standalone network.

14. A method, comprising:

detecting, by a processing system of a router including a processor, first data packets utilizing a first communication platform;

detecting, by the processing system of the router, second data packets utilizing a second communication platform;

marking, by the processing system of the router, a class of service in the first data packets and in the second data packets, wherein the class of service is associated with a quality of service that determines a priority treatment of each data packet and the marking of the class of service is different between the first data packets and the second data packets to prioritize one of the first data packets and the second data packets whichever uses a newer communication platform between the first communication platform and the second communication platform; and scheduling, by the processing system of the router, to forward the first data packet and the second data packet, wherein the scheduling further comprises prioritizing the forwarding based on the marking of the class of service.

15. The method of claim 14, further comprising:

determining the priority treatment of each data packet based on the marked class of service; and queuing, by the processing system of the router, the first data packets and the second data packets in an egress buffer based on the determined priority treatment.

16. The method of claim 14, wherein the first communication platform is configured to implement a Nth generation communication standard and the second communication platform is configured to implement a (N+1)th generation communication standard, and wherein the scheduling further comprises prioritizing the forwarding of the second data packet when data traffic at an egress port of the router reaches a Peak Information Rate (PIR).

17. The method of claim 16, further comprising:

allocating a first differentiated service code point (DSCP) value to the first data packet; and allocating a second DSCP value to the second data packets, wherein the second DSCP value is recognized to classify the second data packets as having a quality of service class indicator (QCI) higher than a QCI associated with the first data packet.

18. The method of claim 14, wherein the marking the class of service further comprises configuring an internet protocol (IP) header of each data packet to mark a DSCP value corresponding to the class of service of each data packet.

19. The method of claim 18, further comprising triggering, by the processing system of the router, a class-based queuing of the first data packets and the second data packets based on the marked DSCP value.

20. The method of claim 14, further comprising configuring, by the processing system of the router, a mapping between a DSCP value and a QCI with respect to the class of service, wherein the mapping between the DSCP value and the QCI changes to reflect changes in the first communication platform, the second communication platform or both.

* * * * *